United States Patent
Chu et al.

(10) Patent No.: US 10,726,061 B2
(45) Date of Patent: Jul. 28, 2020

(54) IDENTIFYING TEXT FOR LABELING UTILIZING TOPIC MODELING-BASED TEXT CLUSTERING

(71) Applicant: International Business Machines Corporation, Armonk, NY (US)

(72) Inventors: Man Chu, Brooklyn, NY (US); Steven M. Pritko, Pittsburg, PA (US); Zhe Zhang, Cary, NC (US); Justin A. Ziniel, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 15/816,170

(22) Filed: Nov. 17, 2017

(65) Prior Publication Data
US 2019/0155947 A1    May 23, 2019

(51) Int. Cl.
*G06F 16/35*    (2019.01)
*G06F 16/332*    (2019.01)
(Continued)

(52) U.S. Cl.
CPC .......... *G06F 16/358* (2019.01); *G06F 40/117* (2020.01); *G06F 40/30* (2020.01); *G06F 40/35* (2020.01); *G06N 3/006* (2013.01); *G06N 5/04* (2013.01); *G06N 20/00* (2019.01); *G10L 15/1815* (2013.01); *G10L 15/22* (2013.01); *G06F 16/24578* (2019.01);
(Continued)

(58) Field of Classification Search
CPC ........ G06N 20/00; G06N 7/005; G06N 3/006; G06F 16/358; G06F 17/2785; G06F 16/3329; G06F 16/353; G06F 16/3322; G06F 16/345; G06F 16/9024; G06F 17/218
USPC ..... 707/738, 739, 740, 776, 797; 704/9, 232
See application file for complete search history.

(56) References Cited

U.S. PATENT DOCUMENTS 8,280,719 B2    10/2012    Miller
8,331,739 B1    12/2012    Abdulkader et al.
(Continued)

OTHER PUBLICATIONS

Blei, David M., "Probabilistic Topic Models", Surveying a suite of algorithms that offer a solution to managing large document archives, Communications of the ACM, Apr. 2012, vol. 55, No. 4, pp. 77-84, DOI:10.1145/2133806.2133826.
(Continued)

*Primary Examiner* — Dangelino N Gortayo
(74) *Attorney, Agent, or Firm* — William H. Hartwell (57) ABSTRACT

Software that selects portions of unlabeled text for labeling, by performing the following operations: (i) receiving a set of unlabeled input text for classification with respect to a particular domain, wherein the domain includes a labeled corpus for which topics of a set of topics correspond to labels from the corpus, and wherein the topics include statistical probability distributions of words in the corpus; (ii) performing topic modeling on the input text to associate portions of the input text with respective classifications, wherein the classifications include statistical probability distributions of topics of the set of topics in the respective portions of the input text; and (iii) applying a machine learning-based selection strategy to the portions of the input text and their respective classifications to identify one or more portions of the input text for labeling.

20 Claims, 6 Drawing Sheets

(51) Int. Cl.
*G06F 16/36* (2019.01)
*G06F 16/2457* (2019.01)
*G06N 5/04* (2006.01)
*G10L 15/22* (2006.01)
*G10L 15/18* (2013.01)
*G06N 3/00* (2006.01)
*G06N 20/00* (2019.01)
*G06F 40/30* (2020.01)
*G06F 40/35* (2020.01)
*G06F 40/117* (2020.01)

(52) U.S. Cl.
CPC ........ *G06F 16/3329* (2019.01); *G06F 16/353* (2019.01); *G06F 16/367* (2019.01)

(56) References Cited

U.S. PATENT DOCUMENTS

| | | | |
|---|---|---|---|
| 2005/0080613 | A1 | 4/2005 | Colledge et al. |
| 2007/0260564 | A1* | 11/2007 | Peters ............... G06F 40/279 706/14 |
| 2012/0041953 | A1* | 2/2012 | Dumais ............... G06F 16/353 707/739 |
| 2015/0066496 | A1* | 3/2015 | Deoras ............... G10L 15/16 704/232 |
| 2015/0324451 | A1 | 11/2015 | Cormack et al. |
| 2016/0203209 | A1* | 7/2016 | Clinchant ............ G06N 20/00 707/738 |
| 2017/0075991 | A1* | 3/2017 | Kataria ............... G06F 16/358 |
| 2018/0114142 | A1* | 4/2018 | Mueller ............... G06K 9/18 |
| 2018/0173699 | A1* | 6/2018 | Tacchi ............... G06F 17/2785 |
| 2018/0365417 | A1* | 12/2018 | Wu ...................... G06F 40/169 |
| 2019/0130244 | A1* | 5/2019 | Mars .................... G06N 20/00 |

OTHER PUBLICATIONS

Blei et al., "Supervised topic models", Part of: Advances in Neural Information Processing Systems 20 (NIPS 2007), 10 pages.

Dasgupta et al., "Hierarchical Sampling for Active Learning", Appearing in Proceedings of the 25th International Conference on Machine Learning, Helsinki, Finland, 2008, pp. 208-215, Copyright 2008 by the author(s)/owner(s).

Gotab et al., "Active Learning for rule-based and corpus-based Spoken Language Understanding models", ASRU 2009, pp. 444-449, © 2009 IEEE.

Hadian et al., "Active Learning in Noisy Conditions for Spoken Language Understanding", Proceedings of COLING 2014, the 25th International Conference on Computational Linguistics: Technical Papers, pp. 1081-1090, Dublin, Ireland, Aug. 23-29, 2014.

Huang et al., "Active Learning by Querying Informative and Representative Examples", Part of: Advances in Neural Information Processing Systems 23 (NIPS 2010), 11 pages.

Jars et al., "Improving Spoken Language Understanding With Information Retrieval and Active Learning Methods", ICASSP 2008, pp. 5001-5004, 1-4244-1484-9/08/, © 2008 IEEE.

Jung et al., "DialogStudio: A workbench for data-driven spoken dialog system development and management", Science Direct, Speech Communication 50 (2008), Received Aug. 30, 2007, received in revised form Mar. 30, 2008, accepted Apr. 5, 2008, pp. 697-715, doi:10.1016/j.specom.2008.04.003, © 2008 Elsevier B.V., All rights reserved.

Nguyen et al., "Active Learning Using Pre-clustering", Appearing in Proceedings of the 21st International Conference on Machine Learning, Banff, Canada, 2004, 8 pages, Copyright 2004 by the authors.

Settles, Burr, "Active Learning Literature Survey", University of Wisconsin—Madison, Computer Sciences Department, Technical Report 1648, Updated on: Jan. 9, 2009, 47 pages.

Sun et al, "Batch-Mode Active Learning With Semi-supervised Cluster Tree for Text Classification", 2012 IEEE/WIC/ACM International Conferences on Web Intelligence and Intelligent Agent Technology, pp. 388-395, 978-0-7695-4880-7/12, DOI 10.1109/WI-IAT.2012.237, © 2012 IEEE.

Tur et al., "Active Labeling for Spoken Language Understanding", Eurospeech 2003—Geneva, pp. 2789-2792.

Tur et al., "Combining active and semi-supervised learning for spoken language understanding", Science Direct, Speech Communication 45 (2005), pp. 171-186, Received Mar. 2, 2004, received in revised form Jul. 27, 2004, accepted Aug. 30, 2004, doi:10.1016/j.specom.2004.08.002, © 2004 Elsevier B.V., All rights reserved.

\* cited by examiner

IDENTIFYING TEXT FOR LABELING UTILIZING TOPIC MODELING-BASED TEXT CLUSTERING

BACKGROUND

The present invention relates generally to the field of spoken dialog systems, and more particularly to improving spoken dialog systems by applying text clustering to select portions of unlabeled spoken text as candidates for labeling.

Spoken dialog systems (SDSes) are computer systems that are able to converse with humans using a voice interface. SDSes are rapidly becoming a popular form of human-computer interaction, offering users an efficient means of satisfying information gathering or transactional objectives using natural language. While the details are often highly application-dependent, it is common for a dialog system to employ a spoken language understanding (SLU) module to infer the intent behind a given user utterance. For example, the utterance "How much do I have in my account?" might be mapped by an SLU module to an "account_balance" intent.

SLU modules are commonly built on complex statistical classifiers that require a vast amount of labeled training data (e.g., known mappings from utterance→intent). Such labeled data is typically obtained by presenting utterances to a subject matter expert (SME) for manual annotation.

Active learning is a known strategy for adaptively choosing which unlabeled examples should be presented to an SME for manual labeling. In contrast to passive learning, wherein training examples are randomly selected from the unlabeled collection, active learning chooses which (unlabeled) examples should be manually labeled to best improve the module's underlying model.

SUMMARY

According to an aspect of the present invention, there is a method, computer program product and/or system that selects portions of unlabeled text for labeling by performing the following operations (not necessarily in the following order): (i) receiving a set of unlabeled input text for classification with respect to a particular domain, wherein the domain includes a labeled corpus for which topics of a set of topics correspond to labels from the corpus, and wherein the topics include statistical probability distributions of words in the corpus; (ii) performing topic modeling on the input text to associate portions of the input text with respective classifications, wherein the classifications include statistical probability distributions of topics of the set of topics in the respective portions of the input text, and wherein the classifications reflect amounts of each topic of the set of topics that are present in the respective portions of the input text; and (iii) applying a machine learning-based selection strategy to the portions of the input text and their respective classifications to identify one or more portions of the input text for labeling.

DETAILED DESCRIPTION

Active learning is a known strategy that has been applied in the training and updating of spoken language understanding (SLU) modules in spoken dialog systems (SDSes). In active learning, certain unlabeled samples are chosen and presented to a subject matter expert (SME) for manual labeling. Existing approaches for using active learning in SDSes generally involve querying strategies where samples are selected based on uncertainty sampling and/or query-by-committee techniques. However, such methods fail to consider the unique nature of textual data. Embodiments of the present invention employ topic modeling-based clustering to extract contextual information that is unique to text corpora, and then incorporate the topic model-based clustering with a flexible active learning module adapted to query corpora based on a variety of objectives. In this way, as will be described further in this Specification, embodiments of the present invention select samples for active learning in a way that is tailored to text-based corpora, thereby improving the manner in which SLU modules within SDSes are trained.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
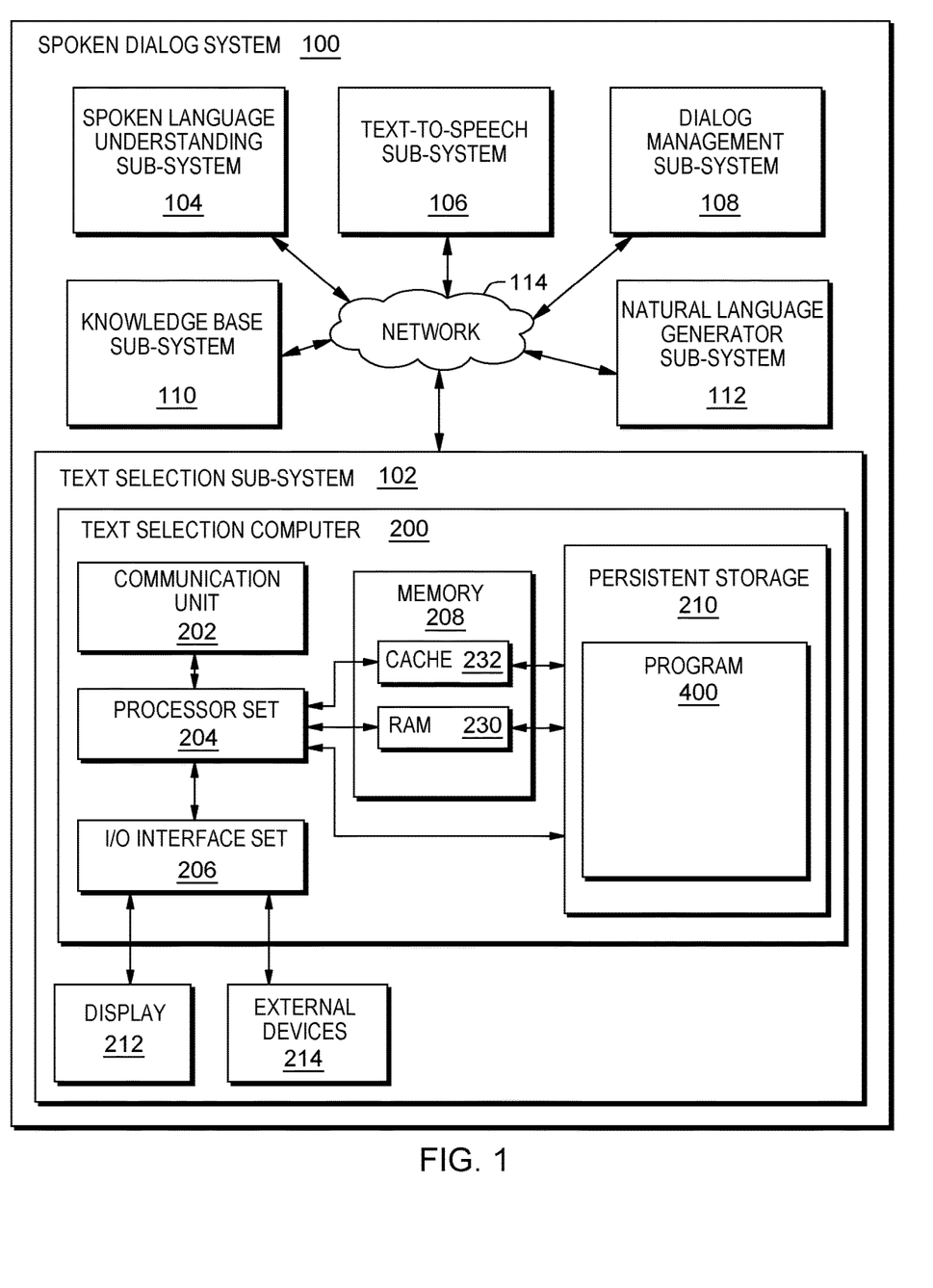
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of spoken dialog system 100, including: text selection sub-system 102; spoken language understanding sub-system 104; text-to-speech sub-system 106; dialog management sub-system 108; knowledge base sub-system 110; natural language generator sub-system 112; communication network 114; text selection computer 200; communication unit 202; processor set 204; input/output (I/O) interface set 206; memory device 208; persistent storage device 210; display device 212; external device set 214; random access memory (RAM) devices 230; cache memory device 232; and program 400.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 400 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 400 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 400 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with text selection computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 400, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
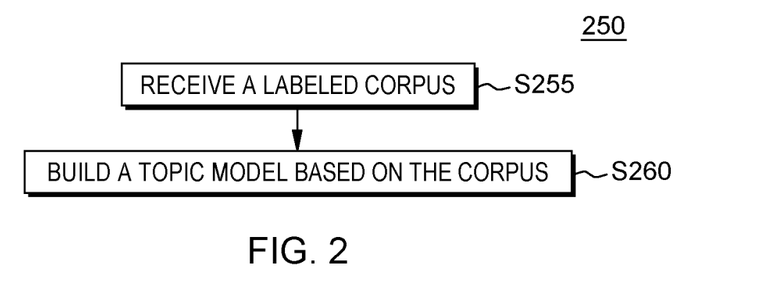
FIG. 2 is a flowchart showing a first method performed, at least in part, by the first embodiment system.
Figure 3:
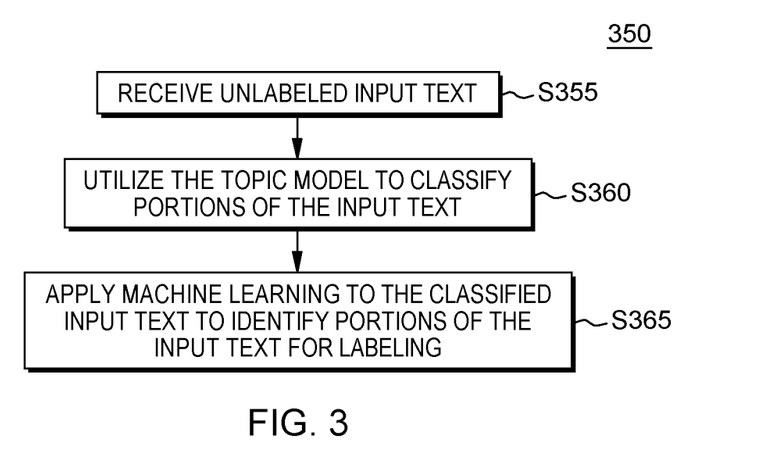
FIG. 3 is a flowchart showing a second method performed, at least in part, by the first embodiment system.
Figure 4:
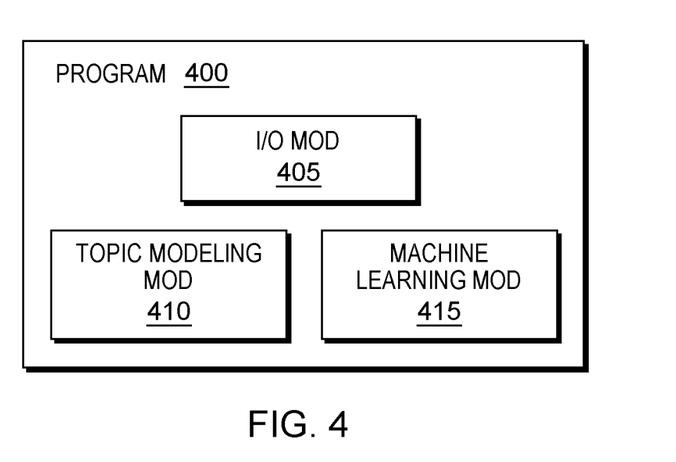
FIG. 4 is a block diagram showing a machine logic (for example, software) portion of the first embodiment system.

FIG. 2 shows flowchart 250 depicting a method according to the present invention. FIG. 3 shows flowchart 350 depicting another method according to the present invention. FIG. 4 shows program 400 for performing at least some of the method operations of flowchart 250 and flowchart 350. These methods and associated software will now be discussed, over the course of the following paragraphs, with extensive reference to FIGS. 2 and 3 (for the method operation blocks) and FIG. 4 (for the software blocks).

Generally speaking, in this example embodiment (also referred to in this sub-section as the "present embodiment," the "present example," the "present example embodiment," and the like), program 400—and, more broadly, text selection sub-system 102—selects unlabeled text for labeling, where the unlabeled text generally includes utterances that a human user would submit to a general purpose digital assistant. Upon labeling, the text and its corresponding labels are then added to a machine learning model associated with spoken language understanding (SLU) sub-system 104 (see FIG. 1)—which provides SLU operations for the digital assistant—thereby improving the accuracy of the machine learning model and, in turn, the digital assistant. It should be noted that this example embodiment is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section. Furthermore, it should be noted that while several embodiments of the present invention—including the present example embodiment—include spoken dialog systems, such embodiments are not meant to be limiting, and the features described herein may be employed in any situation where there is a natural language classifier that can be trained using labeled samples.

Processing begins at operation S255 (see FIG. 2), where I/O module ("mod") 405 (see FIG. 4) receives a labeled corpus pertaining to a particular domain. In the present example embodiment, because the ultimate machine learning model being improved pertains to a general purpose digital assistant, the domain is simply the range of subjects that a human user would expect a digital assistant to be able to address. In particular, in this embodiment, the domain covers the following subjects: (i) general question and answering; (ii) home control, (iii) list creation and management, (iv) news and weather; and (v) banking.

In this embodiment, the corpus contains previously spoken utterances that have been labeled (or "annotated") with intents associated with the digital assistant. Generally speaking, intents are the codified intentions of users of the digital assistant—actions that the digital assistant can perform in response to a user utterance. Some simple examples of intents include: (i) "perform_internet_search," for performing a general internet search; (ii) "turn_up_temperature," for turning up a home's temperature via a connected thermostat; (iii) "add_grocery_item," adding a new item to a grocery list; and (iv) "play_weather," playing an audio-based description of the day's weather. It should be noted, however, that these examples are not meant to be limiting, and that an intent, as used herein, may be any computer-based label for representing a desired intention of an end user's utterance.

Processing proceeds to operation S260, where topic modeling mod 410 builds a topic model based on the corpus. While the process of building a topic model is discussed in much further detail below (in the Further Comments and/or Embodiments sub-section of this Detailed Description), for the purpose of discussing the present embodiment, a few, basic features should be addressed. First, the topic modeling algorithms involved in building the topic model may include any known (or yet to be known) topic modeling algorithm, including, but not limited to, a probabilistic latent semantic analysis (PLSA) algorithm, a latent Dirichlet allocation (LDA) algorithm, an aspect and sentiment unification model (ASUM) algorithm (for example, for modeling opinionated conversation texts), and/or a topics over time (TOT) model algorithm (for example, for modeling conversational texts with temporal information). Second, the building of the topic model results in the determination of a set of "topics" for the corpus, where the topics correspond to the labels (in this case, intents) from the corpus. Third, the topics themselves include statistical probability distributions of words in the corpus. For example, a topic of "general search terms," which corresponds to the "perform_internet_search" intent/label, might include high probabilities of the words "find," "who," "what," "where," "when," and "why." For further examples of topic models and probability distributions according to embodiments of the present invention, see the Further Comments and/or Embodiments sub-section of this Detailed Description.

Once a topic model for the corpus has been built, processing for flowchart 250 terminates. The resulting topic model is then used for the topic modeling operations performed in the method corresponding to flowchart 350, which will now be discussed.

Referring now to FIG. 3, processing for flowchart 350 begins at operation S355, where I/O mod 405 receives a set of unlabeled input text for classification. In the present example embodiment, because the ultimate machine learning model being improved pertains to a general purpose digital assistant, the unlabeled input text simply includes unlabeled, spoken, end user utterances. These unlabeled utterances may come, for example, from historic logs of the digital assistant, or from any other applicable source.

Processing proceeds to operation S360, where topic modeling mod 410 uses the previously built topic model to perform topic modeling on the input text to associate portions of the input text with respective classifications. As with operation S260, discussed above in relation to FIG. 3, the topic modeling of the present operation may utilize any known (or yet to be known) topic modeling algorithm, and generally results in the creation of statistical probability distributions. However, while the probability distributions in operation S260 were of words in the corpus, the probability distributions in the present operation are of topics in the input text. In other words, topic modeling mod 410 utilizes the topics determined in operation S260 to create probability distributions that reflect the amount that each topic is present in respective portions of the input text. These statistical probability distributions of topics are referred to herein as "classifications."

While the "input text" described herein is generally described as a single input text, it should be recognized that input text can be separated into "portions," with each portion having its own respective classification. Generally speaking, these portions can correspond to specific utterances (for example, sentences or sentence fragments), and therefore each utterance can be given a respective classification. However, it should also be recognized that in other embodiments, any portion of the input text may be given its own respective classification, and certain portions may also be given multiple respective classifications, depending on the specifics of the particular topic modeling algorithm being employed.

With regard to the present example embodiment, several spoken user utterances in the input text are provided with associated classifications that reflect the extent to which they include the previously identified topics. For example, an utterance of "what is the weather?" might indicate a strong association with a "weather" topic corresponding to the "play_weather" intent, and might also indicate a weaker, but still existent, association with the "general search terms" topic corresponding to the "perform_internet_search" intent. The classification for this utterance would include the probability distribution of these topics, which could then be used in the following operation to determine whether the utterance should be selected for labeling.

Processing proceeds to operation S365, where machine learning mod 415 applies a machine learning-based selection strategy to the portions of the input text and their respective classifications to identify one or more portions of the input text for labeling. Generally speaking, a purpose of selecting portions of input text for labeling is to select input text which would otherwise not be easily labeled by a typical spoken language understanding (SLU) classifier (such as a classifier of SLU sub-system 104). By selecting difficult-to-label text for manual labeling, not only does the text selection sub-system of the present invention help to label a difficult to label piece of text, but also it also allows the labeled text to be used to train the underlying machine learning model associated with an SLU classifier, thereby resulting in better performance by the classifier in the future.

While many selection strategies may be employed in this operation, there are three particular types of selection which are particularly well tailored to the topic modeling-based classification strategy discussed above. Regarding the first type, in an embodiment, machine learning mod 415 utilizes a selection strategy based on topical distance. In this embodiment, applying the machine learning-based selection strategy includes calculating distances between the statistical probability distributions of respective topics, and identifying a portion of the input text for labeling based on the portion of input text having a prevalence of a topic determined to be close to another topic, based on the calculated distances for the corresponding statistical probability distributions of the respective topics. The "prevalence" of a topic may be based on a simple probability (for example, a 25% chance that any word in the portion of input text corresponds to the topic), or may be based on a comparison to other topics (for example, determining that a topic is prevalent if it determined, based on the probability distribution, to be the most likely topic to be found in the portion of the input text). Similarly, the requisite "closeness" of two topics to warrant consideration for labeling selection may be based on a specific distance (for example, a distance of less than 3), or may be based on a comparison to other distances (for example, selecting a portion of text for labeling when its prevalent topic is closer to another topic than any other topic is). Of course, these examples are not meant to be limiting, and any suitable measure of "prevalence" and/or "closeness" known (or yet to be known) in the art may be utilized. For a further discussion of topical distance based selection strategies according to the present invention, see the Further Comments and/or embodiments sub-section of this Detailed Description.

Regarding the second type of selection strategy, in another embodiment, machine learning mod 415 utilizes a selection strategy based on topical uncertainty. In this embodiment, applying the machine learning-based selection strategy includes computing randomness measures over the statistical probability distributions of respective classifications for respective portions of the input text, and identifying a portion of the input text for labeling based on the portion of the input text having the highest computed randomness measure. Many known (or yet to be known) randomness measures may be used, with a general rule being that when a given portion of the input text has a statistical probability distribution that indicates no clear "strongest" topic (for example, when several topics have similar amounts of presence in the given portion of input text), that portion of the input text may be preferred for labeling. For a further discussion of topical uncertainty based selection strategies according to the present invention, see the Further Comments and/or embodiments sub-section of this Detailed Description.

Regarding the third type of selection strategy, in yet another embodiment, machine learning mod 415 utilizes a selection strategy based on classifier divergence. In this embodiment, applying the machine learning-based selection strategy includes calculating divergences between: (i) the classifications associated with respective portions of the input text, and (ii) classifications performed for the respective portions of the input text by a statistical classifier (such as a classifier of SLU sub-system 104), and identifying a portion of the input text for labeling based on the portion of the input text having the highest calculated divergence. Many known (or yet to be known) methods for calculating divergence may be used, with a general rule being that when two or more different classifications for the same portion of the input text differ, the portion of the input text may be preferred for labeling. For a further discussion of classifier divergence based selection strategies according to the present invention, see the Further Comments and/or embodiments sub-section of this Detailed Description.

In many embodiments, upon identifying one or more portions of the input text for labeling, I/O mod 405 sends (not shown) the one or more identified portions to a subject matter expert for manual labeling. In response to the identified one or more portions of the input text being labeled by the subject matter expert, machine learning mod 415 then adds the labeled portions of the input text to the machine learning model, thereby resulting in an improved machine learning model for associating intents with utterances in a general purpose digital assistant.

Furthermore, in some embodiments, a semi-supervised learning approach may be employed to further improve the machine learning model for the general purpose digital assistant. In these embodiments, in addition to adding the labeled portions of the input text to the machine learning model, machine learning mod 415 also adds additional portions of the input text to the machine learning model after automatically labeling the portions of the input text based on their respective classifications. For example, in one embodiment, machine learning mod 415 automatically labels portions of the input text when their respective classifications indicate a strong prevalence for one topic, labeling those portions of the input text with the intents that correspond to their respective topics. Then, the newly labeled portions of the input text are added to the machine learning model, thereby further improving the machine learning model without requiring additional input from a subject matter expert.

III. Further Comments and/or Embodiments

Some embodiments of the present invention recognize the following facts, potential problems and/or potential areas for improvement with respect to the current state of the art: (i) many existing active learning techniques are agnostic to the details of the hierarchical clustering algorithm employed, and the nature of the datasets on which they operate, and therefore are less tailored to their particular datasets; (ii) existing approaches involving topic modeling do not use topic models to select samples for active learning—they do not leverage the semantic information of topic models to derive interpretable querying strategies; and/or (iii) measuring the distance between sentences is not a trivial task, and many existing clustering approaches, such as approaches based on the K-medoids algorithm, or approaches based on uncertainty sampling (for example, weighted gradient uncertainty) and/or query-by committee, are not well adapted for textual data.

Some embodiments of the present invention may include one, or more, of the following features, characteristics and/or advantages: (i) a text clustering module that is designed for extracting contextual information from text corpora; (ii) a text clustering module that generates a set of topics represented as a probability distribution over words and also assigns a distribution over topics to each document, where the generating is based on words' semantic co-occurrences and similarities, which is important given the diversity of linguistic expressions (allowing for two documents to be assigned to the same cluster even though they do not have any words in common); (iii) an active learning approach that explicitly leverages information that is unique to topic modeling-based clustering, for example, the distribution of words within topics, and the distribution of topics within documents (utterances); (iv) querying strategies that offer substantial interpretability—offering insights to a dialog system designer about which topics/intents can be easily confused, and why particular utterances may prove challenging to the SLU unit being trained; and (v) topic modeling-based clustering that explicitly leverages existing training data to arrive at a stable clustering.

Figure 5:
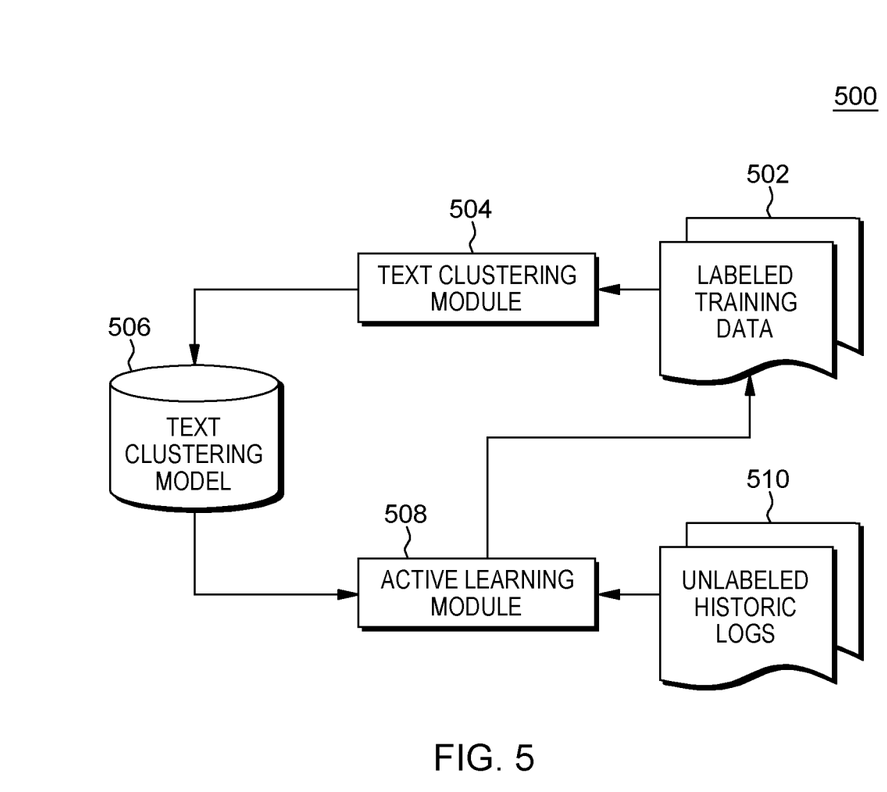
FIG. 5 is a functional block diagram illustrating a systems-level architecture of a spoken dialog system (SDS), according to an embodiment of the present invention.

FIG. 5 is a functional block diagram illustrating a systems-level architecture of another spoken dialog system (SDS), including spoken language understanding (SLU) sub-system 500, according to an embodiment of the present invention. SLU sub-system 500 includes text clustering module 504 and active learning module 508. Text clustering module 504 uses labeled training data 502 (i.e., utterance→intent mappings) to generate text clustering model 506—a machine learning model that represents how individual training examples group together. Text clustering model 506 is then used by active learning module 508 to select from amongst unlabeled historic logs 510 (i.e., actual utterances collected from a running system) those logs that should be presented to a subject matter expert (SME) as candidates for manual labeling. Once labeled, these utterances are added to labeled training data set 502 and the process is repeated.

In this embodiment, text clustering module 504 and active learning module 508 work in concert to explicitly capture the textual ambiguity present in unlabeled historic logs 510, selecting logs with a high degree of ambiguity as being the most worthwhile candidates for manual labeling by an SME.

In an embodiment of present invention, text clustering module 504 is implemented through a text mining framework known as topic modeling. Topic modeling is an unsupervised technique for identifying latent themes ("topics") that exist within a corpus of text.

Figure 6:
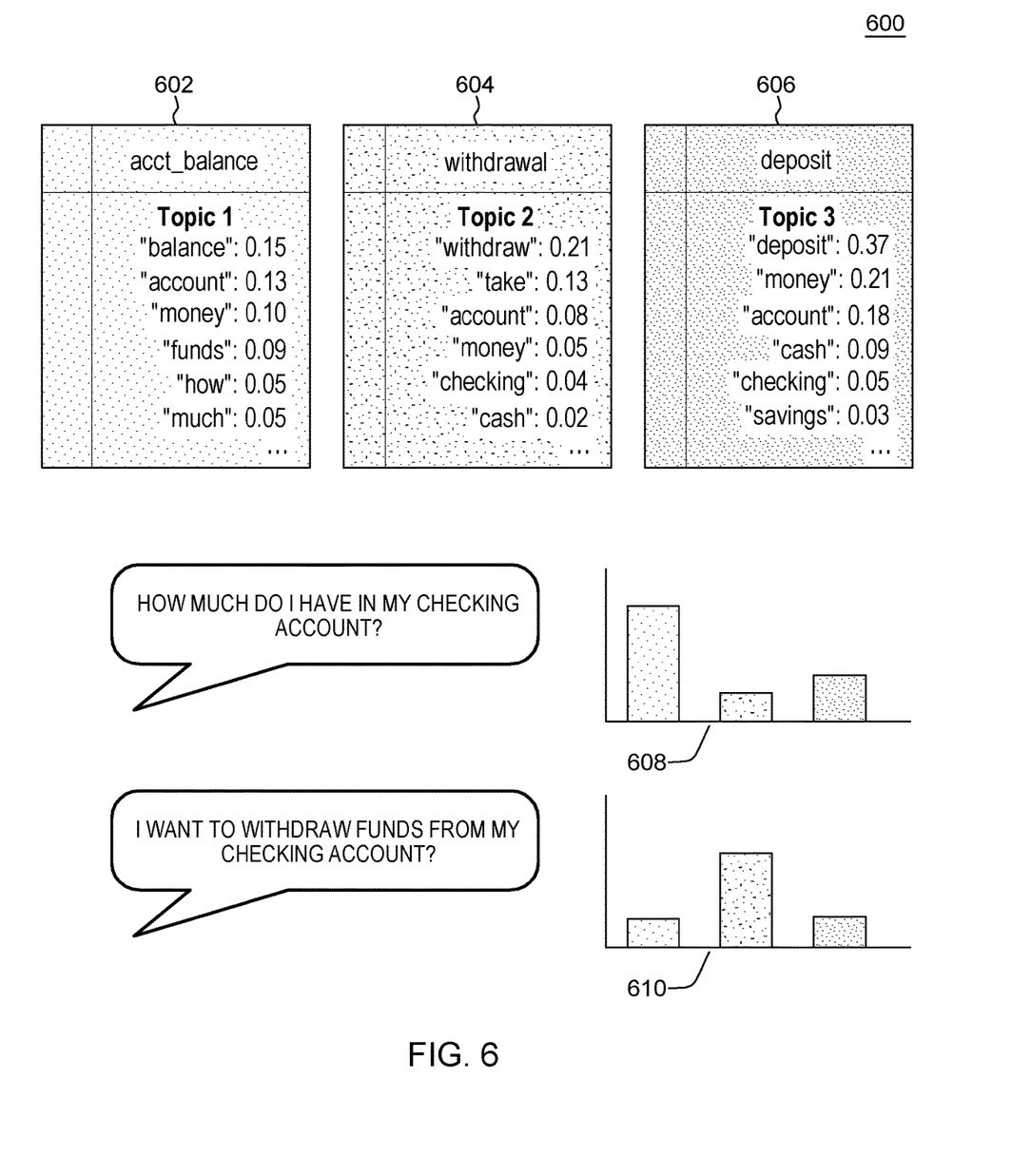
FIG. 6 is a diagram view illustrating example inputs and outputs of a topic modeling algorithm according to an embodiment of the present invention.

FIG. 6 is a diagram view depicting diagram 600, which illustrates example inputs and outputs of a topic modeling algorithm according to an embodiment of the present invention. In this embodiment, an input text corpus includes labeled training data for a personal banking SDS. From the collection of utterances included in the input text corpus, the topic modeling algorithm produces a set of three distinct topics, each of which is represented by a probability distribution (distribution 602, distribution 604, and distribution 606, respectively) over all of the words in the corpus ("the vocabulary"). Topic 1 (see distribution 602), for example, is associated with users seeking account balance information, and assigns higher probability to terms that are used to convey this request, such as "balance", "account", "money", etc. In addition to assigning a probability distribution over the vocabulary for each topic that is identified, topic modeling according to this embodiment includes assigning a distribution (in particular, distributions 608 and 610) over topics to each utterance. For example, in FIG. 6, the utterance "How much do I have in my checking account?" is weighted heavily towards Topic 1, with comparatively small weights assigned to Topics 2 and 3 (as shown in distribution 608).

In this embodiment, a text clustering module (such as text clustering module 504) generates a text clustering model (such as text clustering model 506), using the labeled training examples as the input corpus. For example, the topic modeling algorithm (discussed above) is utilized, taking advantage of known intent labels to guide the generation of topics, to produce a high-quality mapping of (intent, topic) pairs. The resulting text clustering model therefore includes topics (i.e., probability distributions over the vocabulary) and associated intents.

As discussed above in relation to FIG. 5, text clustering model 506 is used as an input to active learning module 508. In this embodiment, the job of active learning module 508 is to select, from a collection of historic logs, unlabeled utterances that should be presented to an SME for manual labeling. Several methods for performing this selection will now be discussed over the course of the following paragraphs.

Topical Distance-Based Selection

In an embodiment of the present invention, active learning module 508 uses a topical distance-based method for selecting unlabeled utterances (or "samples") for manual labeling. In this embodiment, active learning module 508 utilizes the fact that each topic (which itself is associated with a particular intent) is defined by a probability distribution over the vocabulary. Because each distribution is over the same vocabulary, it is possible to calculate a "distance" between two different distributions, and thus, a "distance" between intents. Specifically, active learning module 508 constructs a confusion matrix in which the $(i,j)^{th}$ entry represents the distance between topics i and j. Distance can be measured using any known probability distance measure for multinomial distributions, such as the Bhattacharyya distance or a symmetrized Kullback-Leibler divergence.

Figure 7:
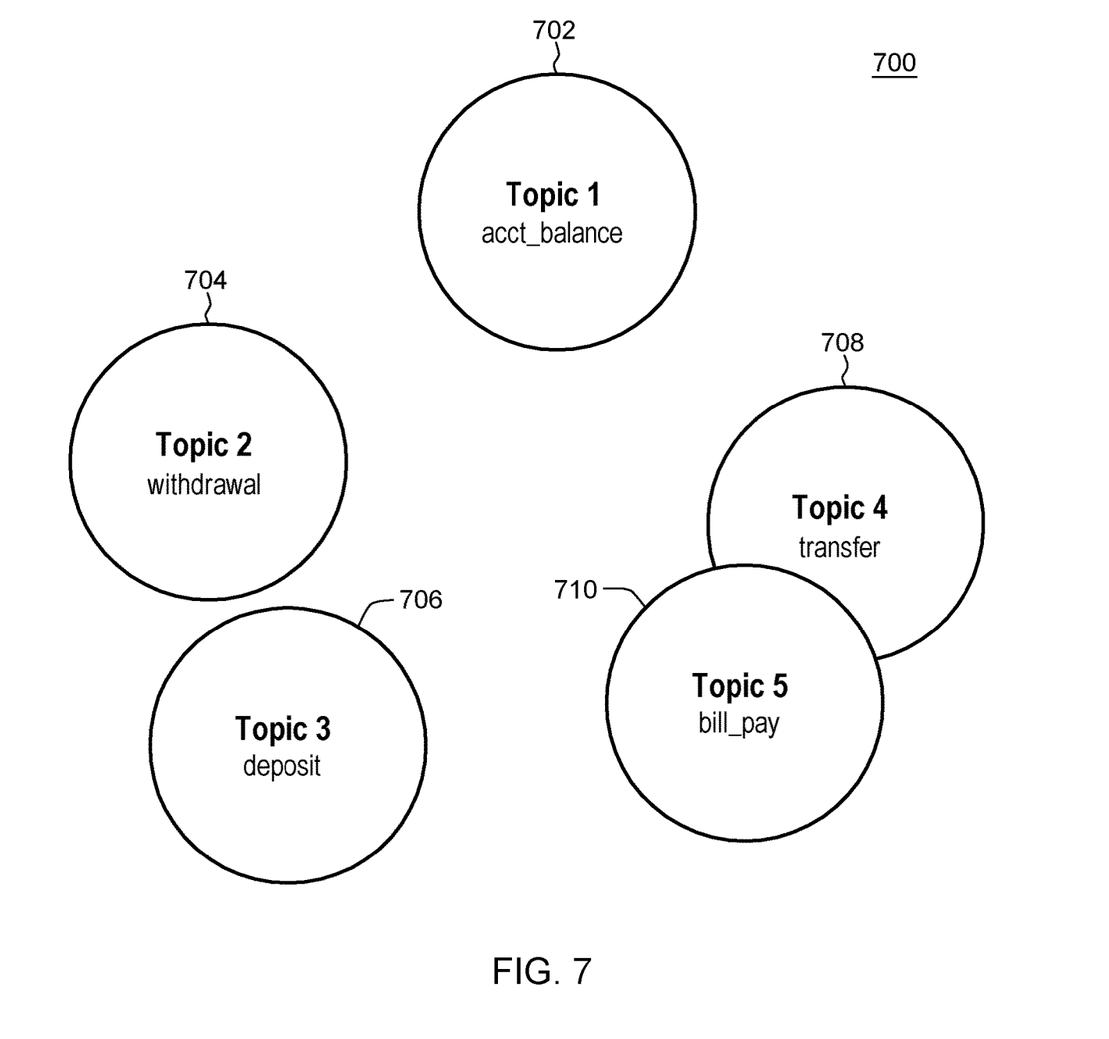
FIG. 7 is a diagram view illustrating how a confusion matrix could be used to identify easily confused (i.e., neighborly) topics/intents, according to an embodiment of the present invention.

FIG. 7 is a diagram view depicting diagram 700, which illustrates how a such a confusion matrix could be used to identify easily confused (i.e., neighborly) topics/intents. Upon constructing the confusion matrix, active learning module 508 prioritizes those topics/intents that are closest to one another as being the most important topics/intents for which additional training data should be collected. Active learning module 508 then presents to the SME utterances from the historic logs that are deemed by the topic model as most likely belonging to either of the topics in question.

In the example shown in FIG. 7, topics 702, 704, 706, 708, and 710 are clustered based on similarity. Because topics 708 and 710 are the closest to one another, active learning module 508 prioritizes utterances associated with topics 708 and 710 as candidates for manual labeling by an SME. In this example, utterances are associated with topics based on a maximum likelihood assignment, where the topic with the highest probability for a given utterance is chosen as the utterance's assignment. Utterances are then selected for labeling based on their respective assignments. In the example depicted in FIG. 7, utterances assigned to topic 4 and topic 5 are selected for presentation to the SME.

Topical Uncertainty-Based Selection

In another embodiment of the present invention, active learning module 508 uses a topical uncertainty-based method for selecting unlabeled utterances (or "samples") for manual labeling. In this embodiment, active learning module 508 leverages the fact that topic modeling produces a distribution over topics for each utterance. By feeding each utterance in the collection of historic logs 510 through text clustering model 506, active learning module 508 can obtain an associated topic distribution for each utterance. A topic distribution that is strongly peaked (for example, when one topic carries most of the probability, such as when the distribution has an entropy of zero) suggests that the associated utterance is fairly typical for that topic. In contrast, a topic distribution that is near-uniform (for example, when the distribution has a maximum entropy value) suggests that the utterance contains words that are not well-described by any one topic. This suggests that the correct intent for this utterance is more likely to be ambiguous, and therefore the utterance should be prioritized for manual labeling.

Figure 8:
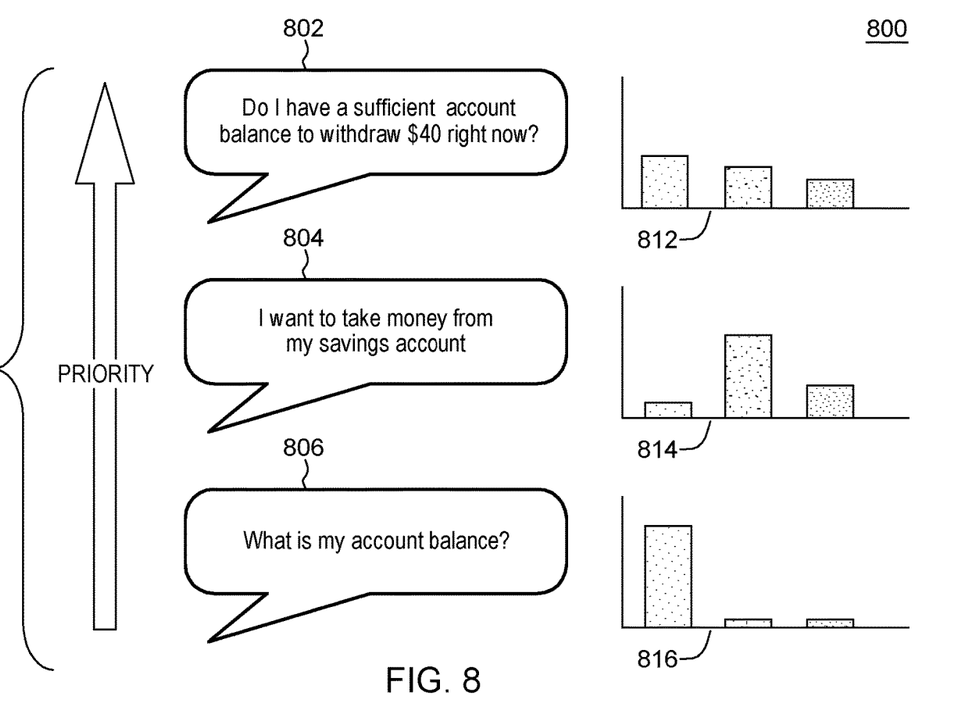
FIG. 8 is a diagram view illustrating the relative priority of three different utterances and their associated topic distributions, according to an embodiment of the present invention.

FIG. 8 is a diagram view depicting diagram 800, which illustrates the relative priority of three different utterances (utterance 802, utterance 804, and utterance 806) and their associated topic distributions (distribution 812, distribution 814, and distribution 816, respectively). In the example shown in FIG. 8, utterance 802 is given the highest priority for labeling, as its topic distribution is the most random (i.e. least certain) of the three. This intuition can be formalized by computing a measure (such as entropy or the Gini index) over the topic distribution that reflects the degree of randomness in the distribution.

Classifier Divergence-Based Selection

In another embodiment of the present invention, active learning module 508 uses a classifier divergence-based method for selecting unlabeled utterances (or "samples") for manual labeling. In this embodiment, active learning module 508 uses text clustering model 506 to perform classification. Specifically, once model 506 has been trained, an utterance from the collection of historic logs can be fed through the model and given a "fuzzy" cluster assignment (that is, a probability of belonging to each of the clusters). Assuming the clustering algorithm was supervised, each cluster will be associated with a corresponding intent. Consequently, the fuzzy cluster assignment serves as a probabilistic classification—a reflection of the clustering algorithm's confidence that the utterance belongs to various intents.

In this embodiment, active learning module 508 compares the fuzzy cluster assignment for a historic utterance against a statistical classification that was made by SLU sub-system 500 when the utterance first passed through the SDS. In many cases, it would be expected that SLU sub-system 500 would make a similar classification to that of the fuzzy cluster assignment. Therefore, cases where SLU sub-system 500 and the fuzzy cluster assignment differ dramatically (as measured by a multinomial distribution-based distance metric like the Bhattacharyya distance or a symmetrized Kullback-Leibler divergence) warrant extra scrutiny, and should be submitted to an SME for manual labeling.

Figure 9:
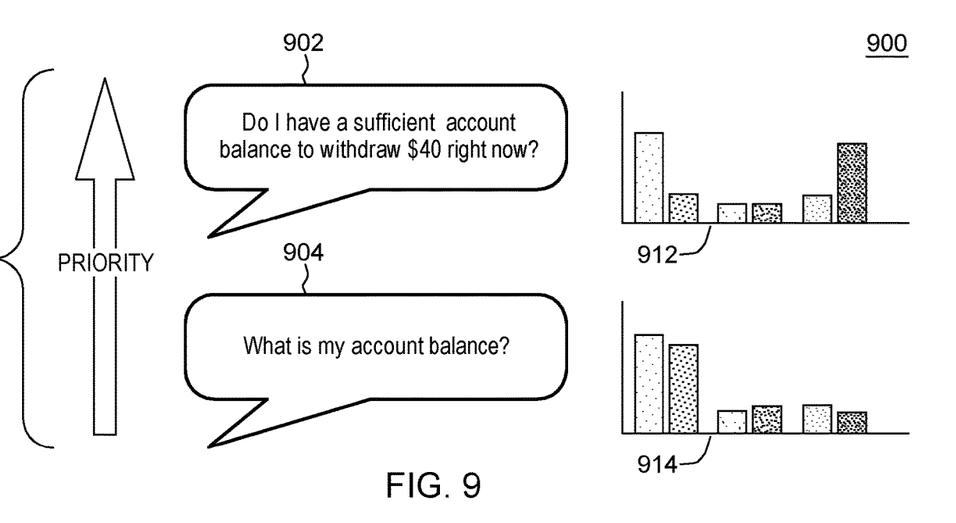
FIG. 9 is a diagram view demonstrating a classifier divergence-based selection strategy on two example utterances, according to an embodiment of the present invention.

FIG. 9 is a diagram view depicting diagram 900, which demonstrates this classifier divergence-based selection strategy on two example utterances (utterance 902 and utterance 904). In FIG. 9, graphs 912 and 914 (corresponding to utterances 902 and 904, respectively) each show two outputs per topic—one (left) for the fuzzy cluster assignment and one (right) for the original SLU classification. As can be seen, utterance 902 demonstrates high divergence between the fuzzy cluster assignment and the original SLU classification, and is therefore submitted for manual labeling.

Some embodiments of the present invention integrate topic modeling-based clustering into the active learning querying strategy (i.e., the strategy by which a pool of unlabeled examples is queried to choose the most informative or representative example(s) for manual labeling by an SME). In these embodiments, beyond simply improving a Spoken Language Understanding (SLU) unit's classification performance while minimizing the cost of the SME's time, this approach is particularly beneficial for dialog system designers due to the unique interpretability provided by this framework. For example, the topic-word distributions that emerge from training a topic modeling-based clustering model can be used to provide insight to a designer about intents that share similar distributions over words. Such insights are difficult, if not impossible, to glean from existing active learning approaches—even those that leverage a similar clustering paradigm.

In some embodiments, leveraging the topic modeling family of clustering algorithms on a corpus of labeled and unlabeled textual training data leads to a variety of distinct, useful, and wholly novel strategies for querying the pool of unlabeled data, while at the same time providing valuable insights to dialog system designers regarding features of their dataset that may impact the SLU's performance.

In another embodiment, a method for utilizing text clustering analysis and ambiguity analysis to select text for classification verification is provided. The method includes receiving a text T for classification analysis in a domain represented by a corpus or a body of works, or a set of documents) annotated (or indexed) by topics. The method further includes applying a modeling algorithm to the text T to associate the text T with one or more classifications C [C1, C2, . . . , Cn] and a statistical probability distribution P [P1, P2, . . . , Pn], where each statistical probability distribution Pi corresponds to each classification Ci over at least one topic in the corpus. The method further includes applying a machine learning (or artificial intelligence) selection strategy to the one or more classifications C [C1, C2, . . . , Cn] in the domain to form an assessment A (A1, A2, . . . , An), and comparing each assessment Ai to a needs review criteria to identify classifications needing review CR [CR1, CR2, . . . , CRj]. In some cases, the needs review criteria is selected from a group consisting of a classification distance, an uncertainty, and a classifier divergence. Further, in some cases: the text T is an utterance, the one or more classifications C are intents, and the classifications needing review CR are for unlabeled (that is, unclassified) utterances and the text T is sent to a subject matter expert (SME) for annotation. Still further, in some cases, the statistical probability distribution P utilizes a supervised training model against the unlabeled utterances over words associated with the at least one topic in the corpus.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User: includes, but is not necessarily limited to, the following: (i) a single individual human; (ii) an artificial intelligence entity with sufficient intelligence to act as a user; and/or (iii) a group of related users.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine-readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
receiving a set of unlabeled input text for classification with respect to a particular domain, wherein the domain includes a labeled corpus for which topics of a set of topics correspond to labels from the corpus, and wherein the topics include statistical probability distributions of words in the corpus;
performing topic modeling on the input text to associate portions of the input text with respective classifications, wherein the classifications include statistical probability distributions of topics of the set of topics in the respective portions of the input text, and wherein the classifications reflect amounts of each topic of the set of topics that are present in the respective portions of the input text;
applying a machine learning-based selection strategy to the portions of the input text and their respective classifications to identify one or more first portions of the input text having a certain amount of textual ambiguity; and
selecting, based, at least in part, on the identifying: (i) the one or more first portions of the input text for manual labeling by a human annotator, and (ii) one or more second portions of the input text for automatic labeling by a spoken language understanding (SLU) classifier.

2. The computer-implemented method of claim 1, wherein applying the machine learning-based selection strategy comprises:
calculating distances between the statistical probability distributions of respective topics; and
identifying a portion of the one or more first portions of the input text based, at least in part, on the portion of the one or more first portions of the input text having a prevalence of a topic determined to be close to another topic, based on the calculated distances for the corresponding statistical probability distributions of the respective topics.

3. The computer-implemented method of claim 1, wherein applying the machine learning-based selection strategy comprises:
computing randomness measures over the statistical probability distributions of respective classifications for respective portions of the input text; and
identifying a portion of the one or more first portions of the input text based, at least in part, on the portion of the one or more first portions of the input text having the highest computed randomness measure.

4. The computer-implemented method of claim 1, wherein applying the machine learning-based selection strategy comprises:
calculating divergences between: (i) the classifications associated with respective portions of the input text, and (ii) classifications performed for the respective portions of the input text by a statistical classifier; and
identifying a portion of the one or more first portions of the input text based, at least in part, on the portion of the one or more first portions of the input text having the highest calculated divergence.

5. The computer-implemented method of claim 1, wherein the portions of the input text are spoken utterances, and wherein the labels are intents.

6. The computer-implemented method of claim 1, further comprising:
sending the identified one or more first portions of the input text to a human subject matter expert for manual labeling.

7. The computer-implemented method of claim 6, further comprising:
in response to the identified one or more first portions of the input text being labeled by the human subject matter expert, adding the labeled one or more first portions of the input text to the corpus.

8. A computer program product comprising a computer readable storage medium having stored thereon:
program instructions to receive a set of unlabeled input text for classification with respect to a particular domain, wherein the domain includes a labeled corpus for which topics of a set of topics correspond to labels from the corpus, and wherein the topics include statistical probability distributions of words in the corpus;
program instructions to perform topic modeling on the input text to associate portions of the input text with respective classifications, wherein the classifications include statistical probability distributions of topics of the set of topics in the respective portions of the input text, and wherein the classifications reflect amounts of each topic of the set of topics that are present in the respective portions of the input text;
program instructions to apply a machine learning-based selection strategy to the portions of the input text and their respective classifications to identify one or more first portions of the input text having a certain amount of textual ambiguity; and
program instructions to select, based, at least in part, on the identifying: (i) the one or more first portions of the input text for manual labeling by a human annotator, and (ii) one or more second portions of the input text for automatic labeling by a spoken language understanding (SLU) classifier.

9. The computer program product of claim 8, wherein the program instructions to apply the machine learning-based selection strategy comprise:
program instructions to calculate distances between the statistical probability distributions of respective topics; and
program instructions to identify a portion of the one or more first portions of the input text based, at least in part, on the portion of the one or more first portions of the input text having a prevalence of a topic determined to be close to another topic, based on the calculated distances for the corresponding statistical probability distributions of the respective topics.

10. The computer program product of claim 8, wherein the program instructions to apply the machine learning-based selection strategy comprise:

program instructions to compute randomness measures over the statistical probability distributions of respective classifications for respective portions of the input text; and program instructions to identify a portion of the one or more first portions of the input text based, at least in part, on the portion of the one or more first portions of the input text having the highest computed randomness measure.

11. The computer program product of claim 8, wherein the program instructions to apply the machine learning-based selection strategy comprise:

program instructions to calculate divergences between: (i) the classifications associated with respective portions of the input text, and (ii) classifications performed for the respective portions of the input text by a statistical classifier; and program instructions to identify a portion of the one or more first portions of the input text based, at least in part, on the portion of the one or more first portions of the input text having the highest calculated divergence.

12. The computer program product of claim 8, wherein the portions of the input text are spoken utterances, and wherein the labels are intents.

13. The computer program product of claim 8, the computer readable storage medium having further stored thereon:

program instructions to send the identified one or more first portions of the input text to a human subject matter expert for manual labeling.

14. The computer program product of claim 13, the computer readable storage medium having further stored thereon:

program instructions to, in response to the identified one or more first portions of the input text being labeled by the human subject matter expert, add the labeled one or more first portions of the input text to the corpus.

15. A computer system comprising:
a processor(s) set; and
a computer readable storage medium;
wherein:
the processor set is structured, located, connected and/or programmed to run program instructions stored on the computer readable storage medium; and
the stored program instructions include:

program instructions to receive a set of unlabeled input text for classification with respect to a particular domain, wherein the domain includes a labeled corpus for which topics of a set of topics correspond to labels from the corpus, and wherein the topics include statistical probability distributions of words in the corpus;

program instructions to perform topic modeling on the input text to associate portions of the input text with respective classifications, wherein the classifications include statistical probability distributions of topics of the set of topics in the respective portions of the input text, and wherein the classifications reflect amounts of each topic of the set of topics that are present in the respective portions of the input text;

program instructions to apply a machine learning-based selection strategy to the portions of the input text and their respective classifications to identify one or more first portions of the input text having a certain amount of textual ambiguity; and program instructions to select, based, at least in part, on the identifying: (i) the one or more first portions of the input text for manual labeling by a human annotator, and (ii) one or more second portions of the input text for automatic labeling by a spoken language understanding (SLU) classifier.

16. The computer system of claim 15, wherein the program instructions to apply the machine learning-based selection strategy comprise:

program instructions to calculate distances between the statistical probability distributions of respective topics; and program instructions to identify a portion of the one or more first portions of the input text based, at least in part, on the portion of the one or more first portions of the input text having a prevalence of a topic determined to be close to another topic, based on the calculated distances for the corresponding statistical probability distributions of the respective topics.

17. The computer system of claim 15, wherein the program instructions to apply the machine learning-based selection strategy comprise:

program instructions to compute randomness measures over the statistical probability distributions of respective classifications for respective portions of the input text; and program instructions to identify a portion of the one or more first portions of the input text labeling based, at least in part, on the portion of the one or more first portions of the input text having the highest computed randomness measure.

18. The computer system of claim 15, wherein the program instructions to apply the machine learning-based selection strategy comprise:

program instructions to calculate divergences between: (i) the classifications associated with respective portions of the input text, and (ii) classifications performed for the respective portions of the input text by a statistical classifier; and program instructions to identify a portion of the one or more first portions of the input text based, at least in part, on the portion of the one or more first portions of the input text having the highest calculated divergence.

19. The computer system of claim 15, wherein the portions of the input text are spoken utterances, and wherein the labels are intents.

20. The computer system of claim 15, the stored program instructions further including:

program instructions to send the identified one or more first portions of the input text to a human subject matter expert for manual labeling.

* * * * *